United States Patent [19]

Ferlay

[11] Patent Number: 4,606,765

[45] Date of Patent: Aug. 19, 1986

[54] PROCESS FOR TREATING ZINC-LADEN DUST ISSUING FROM ELECTRIC STEEL PLANT FURNACES

[76] Inventor: Serge Ferlay, 19, Grande Rue, Champlast 89210 Brienon, France

[21] Appl. No.: 547,138

[22] Filed: Oct. 31, 1983

[30] Foreign Application Priority Data

Nov. 4, 1982 [FR] France .................. 82 18491

[51] Int. Cl.$^4$ ............................................ C22B 19/24
[52] U.S. Cl. .............................. 75/101 R; 75/0.5 AA; 75/109; 75/120; 423/104; 423/109; 423/150; 204/116
[58] Field of Search .............. 423/104, 109, 144, 150; 75/101 R, 120, 109, 0.5 AA; 204/116

[56] References Cited

U.S. PATENT DOCUMENTS

| | | | |
|---|---|---|---|
| 1,719,056 | 7/1929 | Horsch | 423/104 |
| 2,305,829 | 12/1942 | Pieper . | |
| 3,248,212 | 4/1966 | Mellgren et al. | 423/104 |
| 3,743,501 | 7/1973 | Cusanelli et al. | 75/120 |

FOREIGN PATENT DOCUMENTS

| | | |
|---|---|---|
| 0034137 | 8/1981 | European Pat. Off. . |
| 0040659 | 12/1981 | European Pat. Off. . |
| 2305645 | 8/1974 | Fed. Rep. of Germany . |
| 2914013 | 12/1979 | Fed. Rep. of Germany . |
| 631054 | 12/1927 | France . |
| 1381999 | 11/1964 | France . |
| 1554326 | 12/1968 | France . |
| 2336484 | 7/1977 | France . |
| 8114150 | 1/1983 | France . |
| 73039 | 6/1974 | Luxembourg . |
| 1568362 | 5/1980 | United Kingdom . |
| 914502 | 7/1980 | U.S.S.R. . |

OTHER PUBLICATIONS

*Chemical Abstracts*, vol. 97, No. 18, of Feb. 1982, Abstract No. 147,010Q, at page 134.

*Primary Examiner*—John Doll
*Assistant Examiner*—Robert L. Stoll
*Attorney, Agent, or Firm*—Sandler & Greenblum

[57] ABSTRACT

In a hydrometallurgical process of treating zinc-laden dust issuing from electric steel plant furnaces the zinc-laden dust is subjected to a basic leaching or lixiviation in two steps. The dust is subjected to a first leaching of the zinc oxide with a relatively low concentration of caustic soda, then to a second leaching of the zinc ferrite with a higher concentration of caustic soda, then the zinc is extracted from the solution obtained by this basic leaching.

12 Claims, No Drawings

PROCESS FOR TREATING ZINC-LADEN DUST ISSUING FROM ELECTRIC STEEL PLANT FURNACES

BACKGROUND OF THE INVENTION

The present invention relates to a hydrometallurgical process for treating zinc-laden dusts issuing from electric steel plan furnaces.

It is known that the raw materials used in electric steel plants are composed of scrap metal, such as galvanized metal sheets, compressed automobiles, etc . . . , which contain small proportions of heavy metals, such as Zn, Pb, Cu, Cr, etc . . . . At operational temperature of the electric furnaces (about 3000° C.), these metals, which have a low melting point, instantly pass into vapour state (sublimation) and are thus contained in the fumes of the furnace. Dust is removed from these fumes by dry filtration before they are rejected into the atmosphere.

The chemical composition of the dust recovered by filtration is in direct relation with the composition of the scrap metal and special additives supplying the electric furnace. A systematic study of the composition of this dust, made on various samples in various steel plants, shows that they comprise about 21% by weight of Zn, 25% of Fe, as well as a small amount of lead and copper and other oxides. The means content of zinc, of the order of 20 to 21%, fluctuates little in time and in space.

The high temperatures (3000° C.) prevailing in an electric furnace and the oxidizing conditions of the vapours determine the formation of zinc oxide ZnO and zinc ferrite $ZnFe_2O_4$, compound of high temperature. For dust containing from 20 to 21% of Zn, 70 to 80% of the zinc is in the form of ZnO and 20 to 30% in the form of $ZnFe_2O_4$. For a zinc content of 14 to 15%, this proportion is different, namely 50% in the form of ZnO and 50% of $ZnFe_2O_4$.

This mainly zinc-laden dust is of no commercial value per se and is at present discarded in controlled dumps, this creating a serious problem of pollution by the heavy metals (Zn, Pb, Cr).

SUMMARY OF THE INVENTION

It is an object of the present invention to provide a process for treating this dust, making possible to recover the valuable metals that it contains, mainly zinc and accessorily lead, with a view to re-using these metals, and to eliminating an important cause of pollution by these metals.

To this end, this hydrometallurgical process of treating zinc-laden dust issuing from electric steel plant furnaces, is characterized in that the zinc-laden dust is subjected to a basic leaching or lixiviation in two steps, namely a first leaching of the zinc oxide with a relatively low concentration of caustic soda, then a second leaching of the zinc ferrite with a higher concentration of caustic soda, then the zinc is extracted from the solution obtained by this basic leaching.

This process according to the invention offers the advantage that basic leaching brings about a precipitation of the iron contained in the dust in the form of ferric hydroxide $Fe(OH)_3$, which simplifies separation of the iron. In fact, if an acid leaching were used, the zinc would pass in solution in the form of zinc sulfate ($ZnSO_4$) but, during this acid attack, the iron would also pass in solution in the form of ferric sulfate $Fe_2(SO_4)_3$, which would bring about purification of the iron solutions, an operation which is particularly delicate and which yields cumbersome and ill-smelling waste. Such an acid attack which is used at present therefore necessitates a raw material poor in iron and it is not applicable to waste from steel plants containing 25% iron.

In a basic medium at a pH higher than 10, the zinc is soluble in the form of zincate $ZnO_2$. In a concentrated sodium hydroxide solution, the zinc oxide and the zinc ferrites are placed in solution according to the following equations:

$$ZnO + 2NaOH \rightarrow Na_2ZnO_2 + H_2O$$

or $$ZnO + 2OH^- \rightarrow ZnO_2^- + H_2O$$

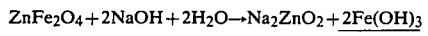

or

The lead and the copper also pass in solution in the form of plumbate and cuprate.

The iron, present in the form of oxide, precipitates in the form of ferric hydroxide, according to the reaction:

The silica is attacked and forms a soluble sodium silicate which it is possible to precipitate by the addition of $Ca^{++}$ ions in the form of slaked lime $Ca(OH)_2$ or by the presence of calcium in the dust.

$$SiO_2 + 2NaOH \rightarrow Na_2SiO_3 + H_2O$$

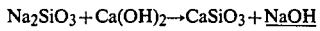

The various parameters determining the treatment of the zinc-laden dust are the concentration of sodium hydroxide in the leaching solution, the concentration of solid in the pulp and the duration of leaching. A study of these various parameters was made on mean samples containing from 20 to 21% of zinc.

The concentration of sodium hydroxide in the leaching solution, provided that it is greater than 100 g/l, is not an essential factor for the attack of the zinc oxide ZnO. However, this concentration must always be such that the solution is not saturated with zincate. As the conductivity of a sodium hydroxide solution is maximum for concentrations of 200 to 250 g/l, a concentration of 250 g/l is preferably chosen for leaching the zinc oxide.

On the other hand, the attack of the zinc ferrite necessitates higher concentrations of sodium hydroxide. Experience has shown that, for a concentration of solid of 20% and a duration of leaching of two hours at boiling temperature, the total rate of recovery increases with the concentration of sodium hydroxide, namely:

at 250 g/l: 82.3%
at 1,000 g/l: 86.3%
at 1,500 g/l: 95.3%
at 2,000 g/l: 97.5%

The concentration of solid has a slight influence between 10 and 30% (by weight) of solid on condition that the solution is not saturated with zinc. The concentration of solid is preferably chosen between 20 and 30% depending on the concentration of zincate necessary for optimization of the zinc extracting operations.

On the other hand, the leaching temperature is an esential factor. For a constant sodium hydroxide concentration of 250 g/l, a constant concentration of solid of 20% and a constant leaching time of 2 hours, it appears that the rate of recovery increases substantially linearly between 50% at 20° C. and 75% at 105° C. This naturally corresponds to the increase in the speed of reaction. Thus the leaching temperature will be chosen at the boiling temperature of the solutions, viz. at around 105° C. for a sodium hydroxide solution of 250 g/l. On the other hand, the placing of the zinc ferrites in solution appears effective only at boiling of the leaching solutions, taking into account the usual durations of leaching, viz. 150° to 200° C. for sodium hydroxide solutions of 1500 and 2000 g/l.

The duration of leaching is linked with the temperature (7 days at 20° C. is equivalent to 120 mins. at 95° C.). In this way, for a constant sodium hydroxide concentration of 250 g/l, a constant concentration of solid of 20% and a constant temperature of leaching of 105° C., it is ascertained that the rate of recovery of leaching of zinc oxide ZnO tends towards a 80% asymptote, in the case of unsorted material with 20-21% of zinc. For unsorted material with 14 to 15% of zinc, this asymptote lies at 55% of recovery. This conclusion is to be connected with the ratio $ZnO/ZnFeO_4$ in the dust to be leached. A duration of leaching of the zinc oxide of 4 hours will thus preferably be chosen to obtain the best rate of recovery.

In summary, for the various parameters involved in the process according to the invention, the values indicated hereinbelow will preferably be chosen:

| leaching of ZnO | |
|---|---|
| concentration of sodium hydroxide | 250 g/l |
| concentration of solid | 20% |
| temperature | 95–105° C. |
| duration | 4 hours |
| leaching of $ZnFe_2O_4$ | |
| concentration of sodium hydroxide | 1500 g/l |
| concentration of solid | 20% |
| temperature | 150° C. |
| duration | 4 hours |

The zinc may be extracted from the solution obtained after the basic leaching phase, by sulfurization, carbonation, hydrolysis or electrolysis.

Electrolysis is preferably used as this process necessitates the most simple installation and produces the maximum increment value in the solutions obtained. The zinc produced by electrolysis must be very pure, which necessitates purification of the solution issuing from leaching.

Apart from zinc, the most abundant elements in the solution are iron, lead and copper.

The presence of iron results essentially from the presence in the filtrate of iron hydroxide not retained during filtration. The lead, under the conditions of leaching of ZnO indicated previously, is placed in solution with a yield comparable to that of zinc, viz. 70 to 75%. The copper also passes in solution but the low content of copper in the unsorted material does not enable a coherent balance of this element to be made. It should also be noted that chromium does not pass in solution.

To eliminate these elements, it suffices to treat the solution with zinc powder:

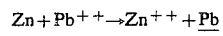

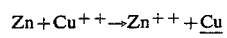

This operation obviously consumes zinc powder, but the zinc placed in solution is recovered subsequently. The few remaining hydroxides of iron are precipitated during this purification by entrainment of the particles with the residues of lead and copper. Experience has shown that the purification of the solution of zincate in the leaching scheme given previously requires 10 kg of zinc powder per ton of unsorted material treated.

After stirring the solution to be purified with zinc powder for 4 hours at 75° C., the residue of purification has the following composition:

Zn = 16.5%
Pb = 52.1%
Cu = 0.05%
Cr = 0.045%
Ag = 0.005%

This lead-rich residue may be treated by pyrometallurgy in order to recover the lead.

As far as the actual electrolysis is concerned, it appears that the sodium hydroxide solutions have a maximum conductance for concentrations of 160 to 280 g/l of sodium hydroxide and, consequently, it is in this range of concentrations that it is important to operate. These concentrations are also suitable for leaching zinc oxide. On the contrary, as it has been seen hereinabove, leaching of the zinc ferrite requires higher concentrations of sodium hydroxide and it is consequently important to dilute the solution with the electrolysis and to recycle the leaching solution. Furthermore, the energy yield decreases when the concentration of zinc decreases but too high a concentration of zinc has the drawback of forming rough particles and to reduce the catalytic activity of the zinc power formed.

For all these reasons, electrolysis will preferably be effected on a sodium hydroxide solution of 250 g/l containing from 10 to 55 g/l of Zn.

Concerning the electrodes used, the best material, taking corrosion into account, for making the anode is a plate of nickel or nickel-coated steel and for the cathode, a plate of magnesium. The optimum current density is 12.9 $A/dm^2$ with a spacing of 3.8 cm between anode and cathode. The temperature of the solution tends to rise from ambient temperature to 40°–45° C. The electrodes should therefore be cooled as, beyond 50° C., redissolution of the zinc powder formed rapidly increases.

The electrolytic zinc powder obtained by this process, with the above characteristics, yields very fine monocrystalline particles, which promotes the catalytic capacities of this product.

The mean granulometry is as follows:

28.7% of undersize at 325 and

54% of undersize at 200.

The density of the dried zinc powder is 1.2 to 1.5.

The process for treating the zinc-laden dust which has been described hereinabove may be summarized as indicated herebelow:

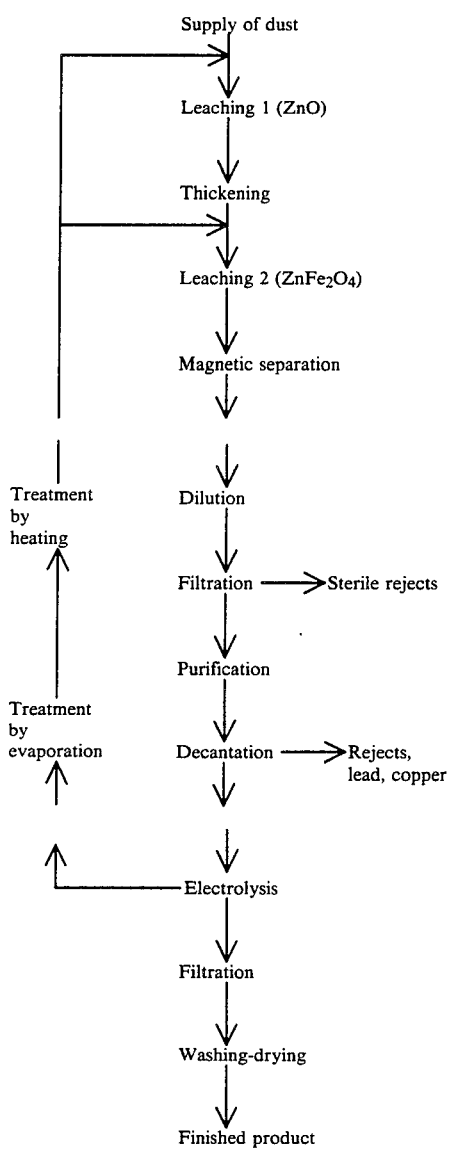

Experience has shown that almost all the zinc oxide is placed in solution by the first leaching. Furthermore, the very ferromagnetic character of the zinc ferrite makes it possible, by a low intensity magnetic separation, to isolate it and recycle it for the second leaching. In this way, 97.5% of the zinc contained in the dust is placed in solution and the sterile rejects contain less than 1% zinc (0.85%).

To be carried out, the process of treatment according to the invention, requires only known equipment which is widely used in hydrometallurgy. It allows the zinc to be economically recovered from the steel plant dust and provides pollution control of heavy metals in the dust, hence a double advantage from the standpoint of economy and health.

However, the basic leaching process which has been described hereinabove presents the drawback of entraining basic washing rejects which cannot be evacuated into the environment due to their very high pH and the concentration of zinc therein which is inadmissible for industrial rejects.

The execution of the process mentioned above therefore raises problems regarding the evacuation of these basic rejects resulting from leaching.

It is therefore a further object of the present invention to solve this difficulty by allowing a non-polluting solution to be rejected into the environment, whilst ensuring additional recovery of the zinc still contained in the basic rejects.

To this end, according to a further feature of the invention, the basic rejects resulting from the different washing phases and containing zinc are neutralized by means of acid rejects coming from galvanization operations and also containing zinc, so as to cause the zinc to precipitate in the form of hydroxide and to recycle it in the leaching phase.

This process takes advantage of the fact that hot galvanization firms which employ large quantities of hydrochloric acid for cleaning the pieces to be galvanized, produce acid rejects having a composition of Zn fluctuating from 30 to 80 g/l, of Fe from 40 to 120 g/l and of HCl from 40 to 130 g/l (about 1 to 3.5N), which rejects contain a fairly considerable quantity of zinc. Consequently, neutralization of the basic rejects resulting from leaching by the acid rejects resulting from galvanization allows the zinc contained in the two effluents to be recovered.

When a pH equal to 7 is attained, an almost complete precipitation of the zinc in the form of zinc hydroxide is obtained. The iron which is in ferrous form in the concentrated solution of hydrochloric acid, also precipitates in the state of ferric hydroxide. In this way, the yield of neutralization is close to 100% in zinc and iron at ambient temperature. This neutralization yields a precipitate of iron and zinc hydroxide which flocculates very easily and which must be shaken fairly strongly before filtration.

As precipitation of the zinc hydroxide is linked with the pH, recycling in the leaching unit is obvious. In fact, as soon as the pH exceeds 10, the zinc hydroxide redissolves in sodium zincate. Such dissolution is total and rapid (15 mins.).

In this way, neutralization of the basic washing solutions (690 liters per ton of treated dust) by the acid rejects from galvanizers (470 liters per ton of treated dust at 40 g/l Zn and 60 g/l Fe and 1.5N) makes it possible to recover 23 kg more zinc per tonne of steel plant dust.

It is therefore seen that neutralization offers the advantage of making it possible to recover both the zinc contained in the rejects from galvanization workshops and the zinc contained in the rejects from leaching. This neutralization brings about the reject of a brine at 190–200 g/l of NaCl at a pH of 7.

The process according to the invention also presents considerable economic interest for the galvanization firms. In fact, at present they pay a considerable sum, of the order of 250 F/t, ex works, to eliminate their acid rejects.

Neutralization also offers assurance as to the difficulties of filtration of the leaching rejects. In fact, if the performances of the filters are inferior to those expected, with washing of the cakes increasing, the quantity of acid to be neutralized will increase, and, with the total production of zinc increasing, will assure a virtually constant plus-value per tonne of treated steel plant dust.

According to a further feature of the invention, the brine resulting from the neutralization operation may be electrolyzed to manufacture an impure hydrochloric acid and an impure sodium hydroxide intended for industrial uses (for example galvanization).

Furthermore, the dust to be leached contains chlorine due the existence of plastics materials (polyvinyl chloride) in the scrap metal supplying the electric furnaces. This chlorine content varies with the origin of the scrap metal (from 1.0 to 2.5% of chlorine and on average 1.7%). The chlorides which are very soluble pass completely in solution and experience has shown that the solutions issuing from leaching have a chlorine content ranging from 3.0 to 4.5 g/l (3.5 g/l on average).

Consequently, according to another feature of the invention, the sodium hydroxide solution issuing from leaching is additionally dechlorinated.

This complementary dechlorination makes it possible to compensate the losses of sodium hydroxide resulting from the losses of the washing solutions serving for neutralization, and additional hydrochloric acid may thus be produced.

By using an electrolysis cell incorporating a diaphragm, manufactured by ICI under the name FM 21, dechlorination of the sodium hydroxide solution yields from 15 to 22.5 kg (17.5 kg on average) of chlorine per ton of treated dust. The production of 210 ton of chlorine for 12000 ton of treated dust thus makes it possible to envisage production of hydrochloric acid since the chlorine and hydrogen are produced simultaneously. Using a KREBS tube, 17.5 kg of chlorine and 0.5 kg of hydrogen may be burnt to manufacture 18 kg of gaseous HCl per ton of treated dust. 50 liters of 35% hydrochloric acid (10 moles/l) per ton of treated dust are thus obtained.

The whole of the process according to the invention may be summarized in the diagram hereinafter:

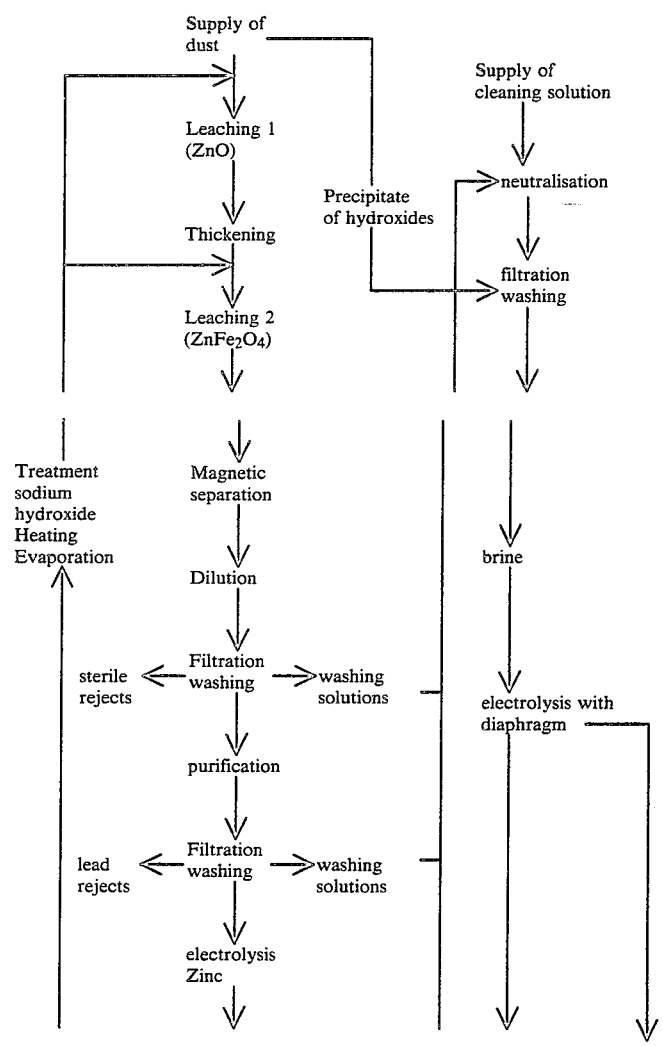

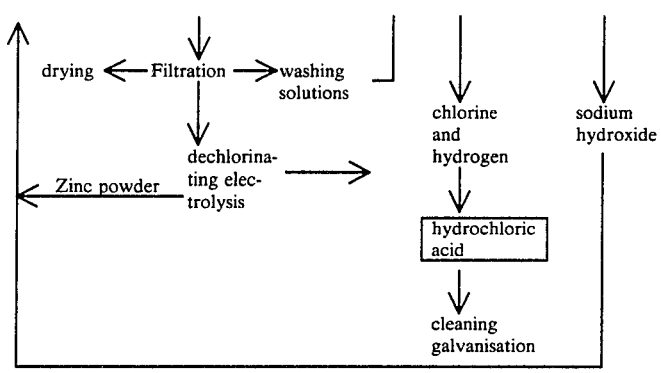

What is claimed is:

1. A two-step process for treating zinc-laden dust comprising zinc oxide and zinc ferrite, comprising the steps of:
    (a) leaching the zinc oxide contained in the dust with a sodium hydroxide solution having a concentration greater than 100 g/l; and
    (b) leaching the zinc ferrite contained in the dust with a sodium hydroxide solution having a concentration greater than the sodium hydroxide solution of step (a).

2. A process according to claim 1 wherein the sodium hydroxides solution used in step (a) has a concentration greater than 100 g/l and less than or equal to 250 g/l.

3. A process according to claim 2 wherein the sodium hydroxide solution used in step (a) has a concentration of from 200 to 250 g/l.

4. A process according to claim 2 wherein the sodium hydroxide solution used in step (b) has a concentration greater than 250 g/l and less than or equal to 2000 g/l.

5. A process according to claim 1 wherein a pulp having a concentration of solid of 10 to 30% by weight is used.

6. A process according to claim 1 wherein each of step (a) and step (b) is carried out at the boiling point of the solution used in the step.

7. A process according to claim 1 wherein step (a) is carried out with a sodium hydroxide solution having a concentration of 250 g/l, a concentration of solid of 20%, at a temperature ranging from 95° to 105° C., and for a duration of about 4 hours.

8. A process according to claim 1 wherein step (b) is carried out with a sodium hydroxide solution having a concentration of 1500 g/l, a concentration of solids of 20%, at a temperature of about 150° C., and for a duration of about 4 hours.

9. A process according to claim 1 wherein the solution issuing from the two-step process is purified by adding zinc powder thereto and by shaking the solution, decantation is effected to eliminate the residue of purification containing lead and copper, and the solution thus purified is subjected to electrolysis, returning the concentration of the sodium hydroxide solution, if necessary, to 160 to 280 g/l.

10. A process according to claim 1 wherein the solution issuing from the two-step process is subjected to a plurality of filtration and washing steps, thereby producing zinc-containing basic rejects, said zinc-containing basic rejects are neutralized by zinc-containing acid rejects from galvanization operations to precipitate zinc hydroxide, and said zinc hydroxide is subsequently recycled to the two step process.

11. A process according to claim 10 wherein the brine resulting from the neutralization operation is electrolyzed to manufacture an impure hydrochloric acid and an impure sodium hydroxide intended for industrial uses.

12. A process according to claim 10 wherein the sodium hydroxide solution issuing from the two step process is dechlorinated.

* * * * *